(12) United States Patent
Xie et al.

(10) Patent No.: US 12,444,395 B1
(45) Date of Patent: Oct. 14, 2025

(54) COMPOSITE DAMPING LIGHTWEIGHT SOUND INSULATION WALL

(71) Applicant: Suzhou University of Technology, Jiangsu (CN)

(72) Inventors: Longxiang Xie, Jiangsu (CN); Xingfang Qian, Jiangsu (CN); Guangzhi Chen, Jiangsu (CN); Lingling Zhang, Jiangsu (CN); Zhida Han, Jiangsu (CN)

(73) Assignee: Suzhou University of Technology, Jiangsu (CN)

( * ) Notice: Subject to any disclaimer, the term of this patent is extended or adjusted under 35 U.S.C. 154(b) by 0 days.

(21) Appl. No.: 19/064,573

(22) Filed: Feb. 26, 2025

Related U.S. Application Data (63) Continuation of application No. PCT/CN2024/116534, filed on Sep. 3, 2024.

(30) Foreign Application Priority Data

Jul. 5, 2024 (CN) .......................... 202410898562.6

(51) Int. Cl.
*G10K 11/168* (2006.01)
*G10K 11/172* (2006.01)

(52) U.S. Cl.
CPC .......... *G10K 11/168* (2013.01); *G10K 11/172* (2013.01)

(58) Field of Classification Search
CPC .......................... G10K 11/168; G10K 11/172
See application file for complete search history.

(56) References Cited

U.S. PATENT DOCUMENTS

| | | | | |
|---|---|---|---|---|
| 3,831,710 A | * | 8/1974 | Wirt ........................ | B32B 27/08 428/116 |
| 4,084,367 A | * | 4/1978 | Saylor .................. | B29D 24/005 428/116 |

(Continued)

FOREIGN PATENT DOCUMENTS

| | | |
|---|---|---|
| CN | 103603472 | 2/2014 |
| CN | 105803965 | 7/2016 |

(Continued)

OTHER PUBLICATIONS

"International Search Report (Form PCT/ISA/210) of PCT/CN2024/116534," mailed on Dec. 3, 2024, pp. 1-5.

(Continued)

*Primary Examiner* — Forrest M Phillips
(74) *Attorney, Agent, or Firm* — JCIPRNET (57) ABSTRACT

Disclosed is a composite damping lightweight sound insulation wall, including lightweight sound insulation layers, composite damping layers and a sound absorption matching layer, the composite damping layers are positioned on both sides of the sound absorption matching layer, and the lightweight sound insulation layers are positioned on outer surfaces of the composite damping layers; each of the composite damping layers includes damping layers, shear columns and an air layer, the damping layers are respectively arranged on both ends of the shear columns, the shear columns are periodically distributed along the damping layers, and the air layer is located between the adjacent damping layers; and the sound absorption matching layer includes porous sound-absorbing material, Helmholtz resonant cavities and light steel furring, the light steel furring are snap-fitted on both sides of the porous sound-absorbing material, and the Helmholtz resonant cavities are embedded inside the porous sound-absorbing material.

9 Claims, 6 Drawing Sheets

(56) References Cited

U.S. PATENT DOCUMENTS

| | | | | |
|---|---|---|---|---|
| 4,155,211 | A * | 5/1979 | Saylor | E04B 2/7422 |
| | | | | 428/113 |
| 8,567,558 | B2 * | 10/2013 | Nakajima | E04C 2/365 |
| | | | | 181/290 |
| 9,607,598 | B2 * | 3/2017 | Leon | B32B 3/12 |
| 9,732,677 | B1 * | 8/2017 | Chien | G10K 11/172 |
| 10,480,184 | B2 * | 11/2019 | Berneth | G10K 11/16 |
| 11,524,792 | B2 * | 12/2022 | Simon | B64D 29/00 |
| 11,780,384 | B2 * | 10/2023 | Fukumoto | G10K 11/168 |
| | | | | 181/290 |
| 11,794,670 | B2 * | 10/2023 | Masumura | B32B 3/12 |
| 2018/0135725 | A1 * | 5/2018 | Sugita | E04H 9/0215 |
| 2023/0131268 | A1 * | 4/2023 | Alglave | B29C 45/561 |
| | | | | 264/241 |

FOREIGN PATENT DOCUMENTS

| | | |
|---|---|---|
| CN | 106782482 | 5/2017 |
| CN | 108909083 | 11/2018 |
| CN | 110905242 | 3/2020 |
| CN | 115559437 | 1/2023 |
| CN | 220035758 | 11/2023 |
| EP | 0467476 | 1/1992 |
| JP | 2016020941 | 2/2016 |

OTHER PUBLICATIONS

"Written Opinion of the International Searching Authority (Form PCT/ISA/237) of PCT/CN2024/116534," mailed on Dec. 3, 2024, pp. 1-4.

\* cited by examiner

COMPOSITE DAMPING LIGHTWEIGHT SOUND INSULATION WALL

CROSS REFERENCE TO RELATED APPLICATIONS

The present application is a continuation application of international PCT application serial no. PCT/CN2024/116534, filed on Sep. 3, 2024, which claims the priority of the Chinese patent with the application No. 202410898562.6, filed with China National Intellectual Property Administration on Jul. 5, 2024, which is incorporated in its entirety herein by reference.

TECHNICAL FIELD

The present disclosure belongs to sound insulation walls, and particularly relates to a composite damping lightweight sound insulation wall.

BACKGROUND

With the rapid development of the economy and the rapid advancement of industrialization and urbanization, noise pollution has become a fourth largest global environmental issue following air pollution, water pollution, and solid waste pollution. The official implementation of the Law of the People's Republic of China on Noise Pollution Prevention and Control not only raises higher standards for environmental noise management but also reflects the growing concern and legal consciousness of the public regarding noise pollution. Primary sources of noise, such as traffic noise, industrial noise, construction noise, and social noise, have severely interfered with the people's rest, work and daily life. In order to maintain a good ecological environment, achieve sustainable social development, and improve people's quality of life, the development of new vibration-damping and noise-reducing materials has become a key means of noise control. Compared with traditional noise control methods, new materials are required not only to have excellent acoustic performance but also to consider the design principles of high strength and lightweight, so as to meet various requirements of modern buildings and transportation facilities for material performance.

At present, noise isolation is mainly achieved using sound insulation walls. However, traditional sound insulation walls, such as brick-and-earth structures, are often heavy and exhibit poor low-frequency sound isolation performance due to mass law. While lightweight sound insulation walls, such as a combination of double-layer gypsum boards with light steel furring and porous sound-absorbing materials, reduce weight to some extent, still have room for improvement in low-frequency sound insulation improvement, and their overall sound insulation effect is limited.

SUMMARY

Objective: In order to overcome the shortcomings of the prior art, the present disclosure aims to provide a composite damping lightweight sound insulation wall, which features a novel structure, has lightweight and high-efficiency, and wide-band low-frequency sound insulation characteristics, and exhibits excellent overall performance.

Technical solution: the composite damping lightweight sound insulation wall provided in the present disclosure includes lightweight sound insulation layers, composite damping layers, and a sound absorption matching layer, where the composite damping layers are positioned on both sides of the sound absorption matching layer to form a sandwich structure; and the lightweight sound insulation layers are positioned on outer surfaces of the composite damping layers; each of the composite damping layers includes damping layers, shear columns, and an air layer, the damping layers are respectively arranged on both ends of the shear columns, the shear columns are periodically distributed along the damping layers, and the air layer is located between the adjacent damping layers; and the sound absorption matching layer consists of porous sound-absorbing material, Helmholtz resonant cavities, and light steel furring, the light steel furring are respectively snap-fitted on both sides of the porous sound-absorbing material, and the Helmholtz resonant cavities are tilted and embedded inside the porous sound-absorbing material.

Further, a total thickness of the lightweight sound insulation layer, the composite damping layer, and the sound absorption matching layer is 30-60 mm, and preferably 50 mm.

Further, the lightweight sound insulation layer includes a surface decorative layer, a flexible connection layer, and a galvanized steel plate, where the flexible connection layer is arranged between the surface decorative layer and the galvanized steel plate, and the galvanized steel plate is connected to the composite damping layers. The surface decorative layer is made of wood board, gypsum board, or fiberboard, with a thickness is of 1-5 mm, and preferably 1 mm. The flexible connection layer is made of silicone rubber foam, with a thickness of is 1-3 mm, and preferably 3 mm; and a thickness of the galvanized steel plate is 1-2 mm, and preferably 2 mm.

Further, each of the damping layers is a silicone-based viscoelastic damping plate, with a thickness of 2-5 mm, and preferably 3 mm. The air layer is an impedance matching layer, with a thickness of 3-8 mm, and preferably 5 mm. Each of the shear columns is an elastic double C-shaped truncated cone structure, with an upper base radius of 0.5-3 mm, and preferably 1 mm; a lower base radius of 1-5 mm, and preferably 2.5 mm; and a height of 3-8 mm, and preferably 5 mm; and the shear column is made of silicone rubber, nitrile rubber, or styrene butadiene rubber. A number of the shear columns is 4-48, and preferably 24.

Further, the porous sound-absorbing material is made of one or more of fiber materials and foam materials; each of the Helmholtz resonant cavities is a single-opening or double-opening Helmholtz resonator, and a number thereof is 2-30, and preferably 16; and the light steel furring is U-shaped, with a thickness of 20-50 mm, and preferably 20 mm.

Working principle: when a sound wave are vertically incident on the lightweight sound insulation wall, the lightweight sound insulation layer first takes effect, significantly reducing energy of high-frequency sound waves through interface reflection and scattering. However, due to processing accuracy and possible errors during installation, a small amount of high-frequency sound waves could pass through and continue to propagate forward due to slits in the lightweight sound insulation wall. When middle and low-frequency sound waves pass through the lightweight sound insulation layer and enter the composite damping layer, energy of the middle-frequency sound waves and part of the low-frequency sound waves are effectively dissipated due to joint action of the viscoelasticity of the damping material and shear and internal friction mechanism of the shear column. Subsequently, when a small amount of the high-frequency sound waves and part of the low-frequency sound waves reach the sound absorption matching layer, the thermal viscous effect of the porous material greatly absorbs the energy of the high-frequency sound waves. At the same time, the embedded Helmholtz resonant cavities make use of resonance sound absorption effect to specifically absorb sound waves of a specific frequency. Finally, the remaining low-frequency sound waves cannot penetrate the lightweight sound insulation wall, due to the viscoelasticity and shear friction of the composite damping layer on the other side of the sound absorption matching layer, as well as the reflection and scattering mechanism of the lightweight sound insulation layer, thereby effectively isolating the noise. The lightweight sound insulation layer and the composite damping layer on both sides of the sound absorption matching layer are asymmetric structures, which avoid "sound bridge" phenomena and reduce the transmission of sound waves caused by coincidence effect, thereby significantly improving the overall sound insulation performance of the structure.

Beneficial effects: compared with the prior art, the present disclosure has the remarkable features as follows:

1. The present disclosure adopts a multi-layer structure, including lightweight sound insulation layers, composite damping layers, and an intermediate sound absorption matching layer, the layers are bonded by hot pressing with structural adhesive to form a tight whole, the design not only ensures the structural novelty of the sound insulation wall but also achieves the characteristics of thin thickness, light weight, and low surface density, thereby making the wall meet the demand for lightweight materials in modern architecture while providing excellent sound insulation performance.

2. The lightweight sound insulation wall has excellent performance in a low-frequency range and has a wide sound insulation band, which is mainly attributed to the synergistic effect of the damping material and the shear columns in the composite damping layer, as well as the sound absorption effect of the porous material and the Helmholtz resonant cavities in the sound absorption matching layer. The design enables the sound insulation wall to effectively isolate low-frequency sound waves, reduce the propagation and reflection of sound waves, thereby ensuring the overall excellent sound insulation performance.

3. The sound insulation performance is closely associated with its structural parameters. The coupling and synergy between various layers of materials can be optimized by adjusting a structural thickness, structural parameters and number of shear columns, size parameters, structural form, a number of Helmholtz resonant cavities, the adjustability allows the sound insulation wall of the present disclosure to be customized according to specific needs, so as to meet the sound insulation requirements of different occasions.

4. The asymmetric structure adopted by the present disclosure effectively reduces an impact of the coincidence effect on the sound insulation performance. By changing the structural form, it is difficult for sound waves to form resonance during propagation, thereby reducing overall transmission loss of the structure. This design not only ensures the stability of low-frequency sound insulation performance, but also enables the sound insulation wall of the present disclosure to widely replace existing lightweight sound insulation walls, providing efficient sound insulation solutions for various buildings.

DETAILED DESCRIPTIONS OF THE EMBODIMENTS

Figure 1:
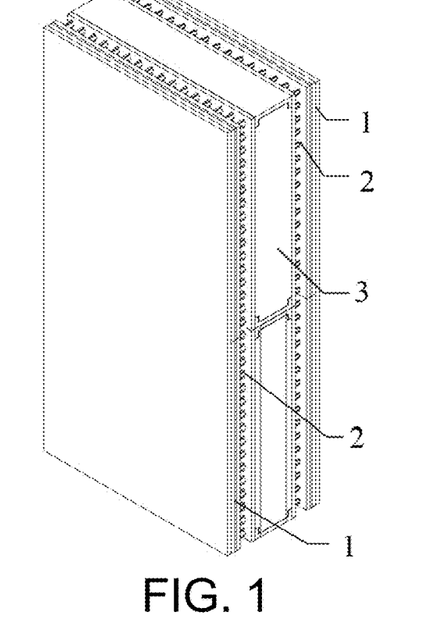
FIG. 1 is a structural schematic diagram according to the present disclosure.
Figure 2:
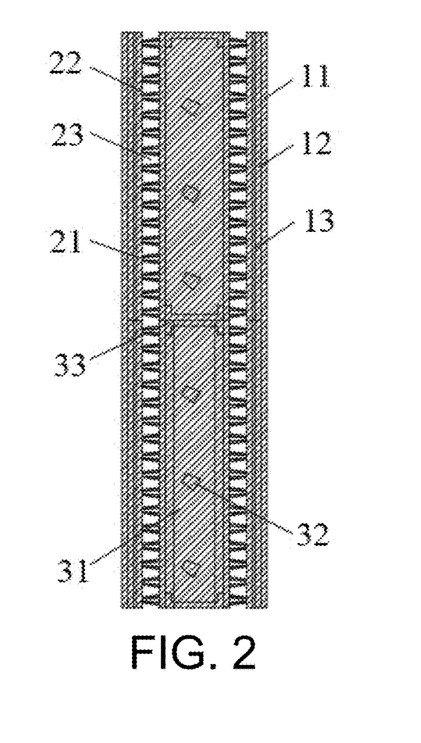
FIG. 2 is a sectional view according to the present disclosure.
Figure 3:
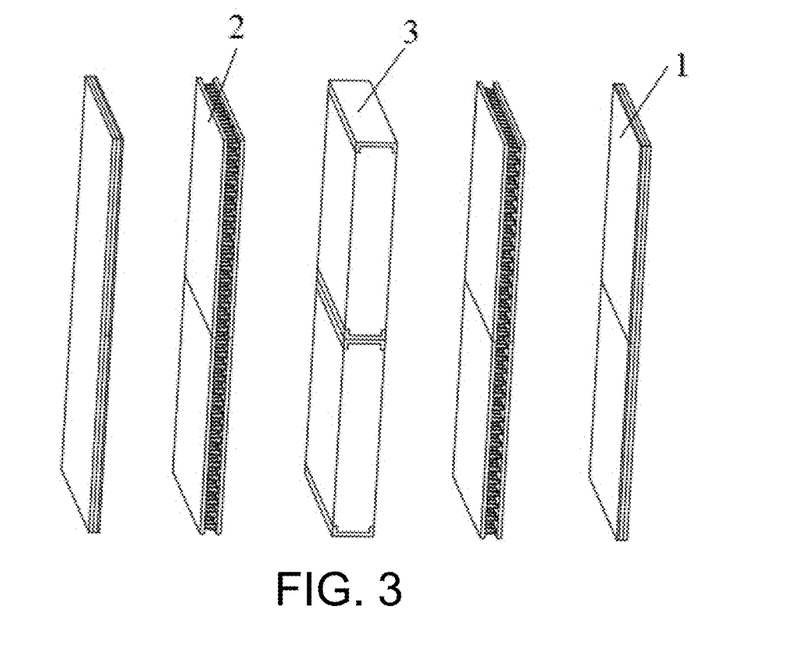
FIG. 3 is an exploded view of a structure according to the present disclosure.
Figure 4:
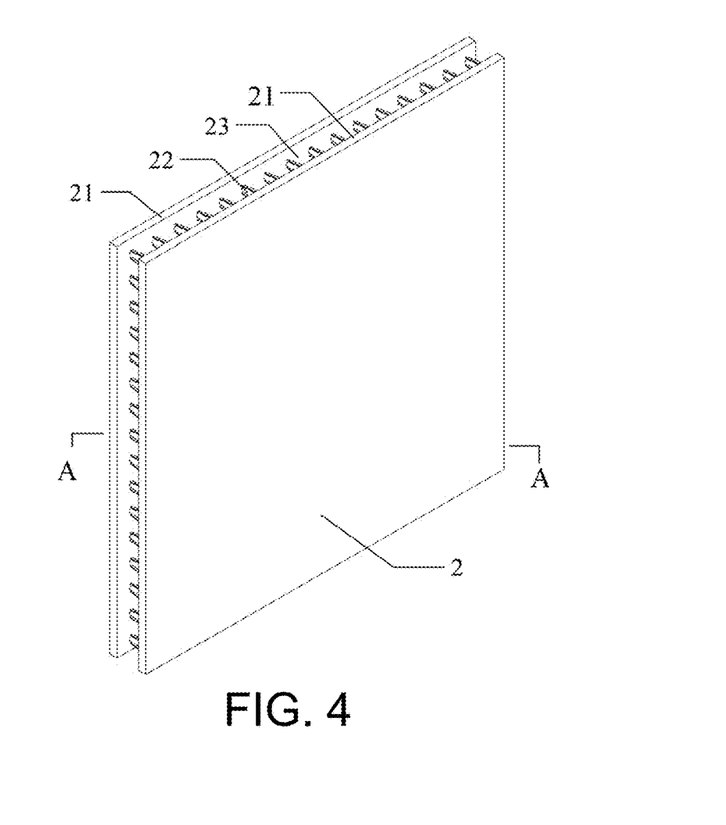
FIG. 4 is a structural schematic diagram of a composite damping layer 2 according to the present disclosure.
Figure 5:
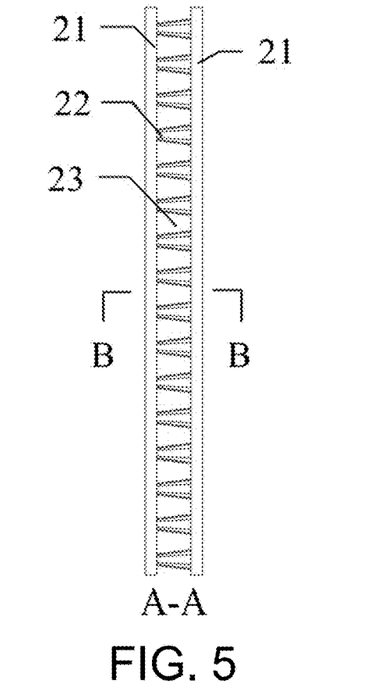
FIG. 5 is a sectional view of an A-A plane of a composite damping layer 2 according to the present disclosure.
Figure 6:
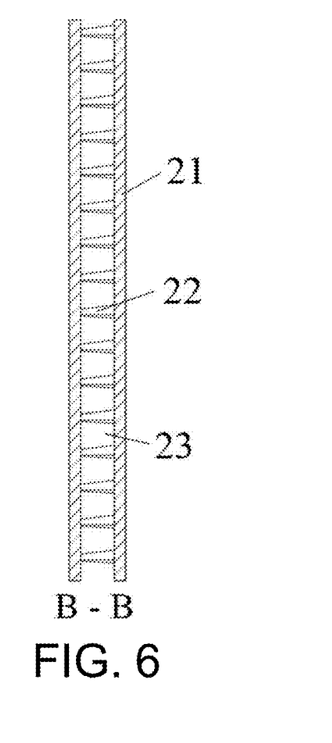
FIG. 6 is a sectional view of a B-B plane of a composite damping layer 2 according to the present disclosure.
Figure 7:
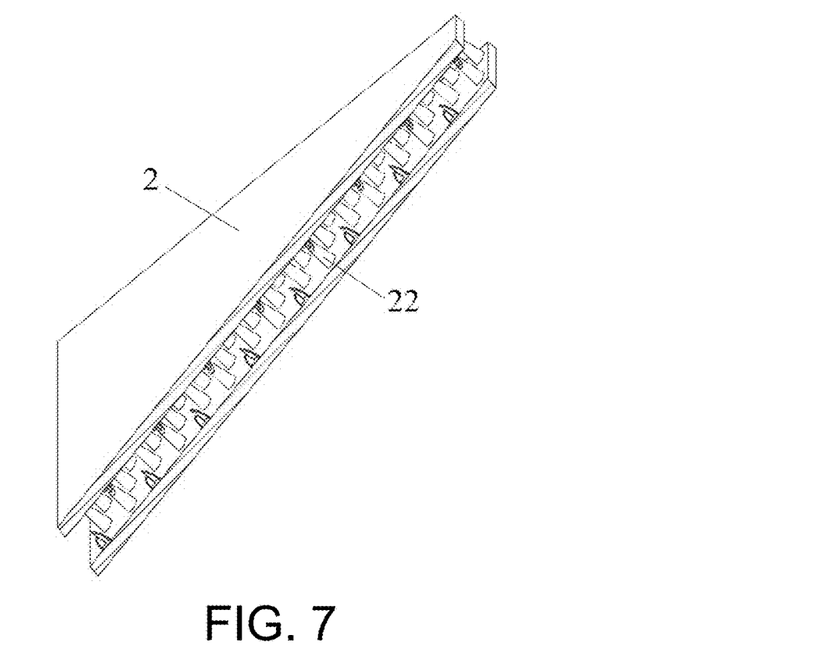
FIG. 7 is a schematic diagram of a connection among shear columns 22 according to the present disclosure.

As shown in FIGS. 1-3, provided is a composite damping lightweight sound insulation wall, which includes two layers of lightweight sound insulation layers 1, two layers of composite damping layers 2, and an intermediate sound absorption matching layer 3, the layers are bonded by hot pressing with structural adhesive, with overall dimensions of 700 mm (W)×1400 mm (D)×50 mm (H). The lightweight sound insulation layers 1 are positioned on outer surfaces of the composite damping layers 2, and the composite damping layers 2 are positioned on both sides of the sound absorption matching layer 3 to form a sandwich structure. The lightweight sound insulation layer 1 is a three-layer "sandwich" structure, consisting of a surface decorative layer 11, a flexible connection layer 12, and a galvanized steel plate 13, the layers are also bonded by hot pressing with structural adhesive, with overall dimensions of 700 mm (W)×1400 mm (D)×6 mm (H), and the galvanized steel plate 13 is fixedly connected to the composite damping layer 2 using pneumatic nails. The surface decorative layer 11 is made of wood, which provides an aesthetically pleasing appearance and acts as an outermost protective layer of the sound insulation wall, with a thickness of 1 mm. The flexible connection layer 12 is made of silicone rubber foam, which exhibits excellent flexibility and elasticity capable of absorbing and reducing propagation of sound waves, while also producing some vibration isolation effect, with a thickness is 3 mm. The galvanized steel plate 13 has a thickness of 2 mm, and exhibits good firmness and metallic properties capable of enhancing sound insulation effect and providing structural stability.

As shown in FIGS. 4-7, each of the composite damping layers 2 includes damping layers 21, shear columns 22, and an air layer 23, the layers are bonded by hot pressing with structural adhesive, with overall dimensions of 700 mm (W)×1400 mm (D)×10 mm (H). The damping layers 21 are fixedly connected to both ends of the shear columns 22, where one end of the damping layer 21 has a thickness of 3 mm, and the other end has a thickness of 2 mm; and the air layer 23 is located between the two damping layers 21. The damping layer 21 is a silicone-based viscoelastic damping plate with a thickness of 3 mm, which is configured to absorb and dissipate sound wave energy, and reduce propagation of sound waves. The shear columns 22 are made of silicone rubber and are in a double-C shaped truncated cones, with structural dimensions of 1 mm (r)×2.5 mm (R)×5 mm (H). The shear columns 22 are periodically distributed between the two damping layers 21, and are capable of effectively sound waves and reducing a propagation intensity of the sound waves, and a number of the shear columns is 24. The air layer 23 is an impedance matching layer with a thickness consistent with that of the shear column 22, and both of which are 5 mm; the air layer is capable of adjusting propagation characteristics of sound waves and working together with the damping layers 21 to improve the sound insulation effect; and the composite damping layer 2 is fixedly connected to a light steel furring 33 of the sound absorption matching layer 3 by bolts.

Figure 8:
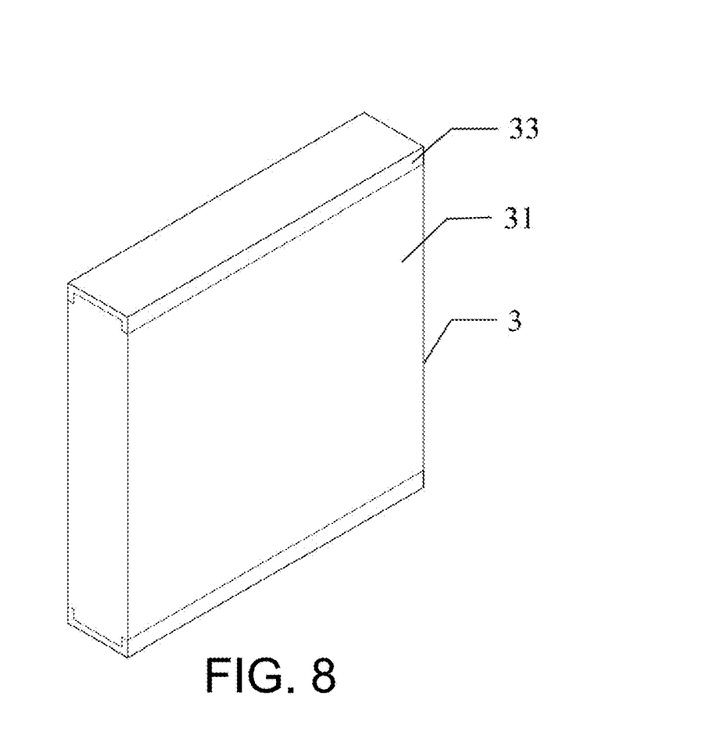
FIG. 8 is a structural schematic diagram of a sound absorption matching layer 3 according to the present disclosure.
Figure 9:
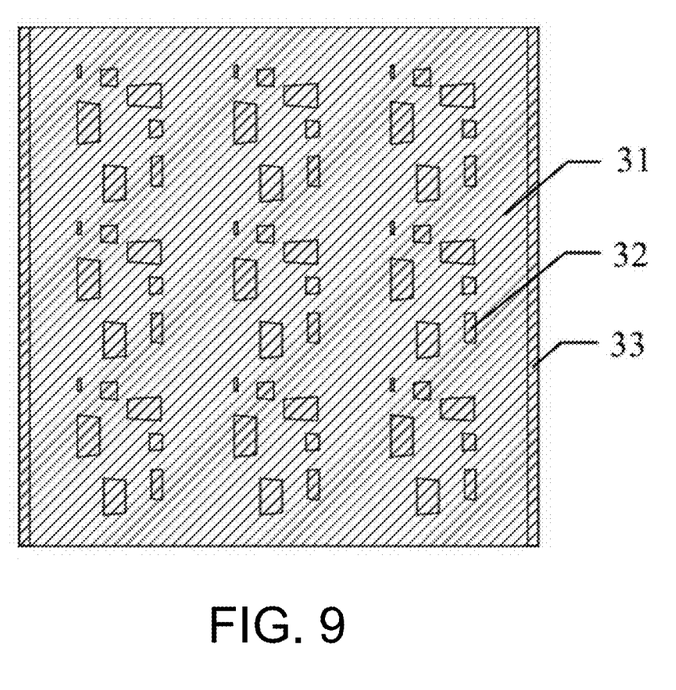
FIG. 9 is a sectional view of a sound absorption matching layer 3 according to the present disclosure.

As shown in FIGS. 8-9, the sound absorption matching layer 3 consists of porous sound-absorbing material 31, Helmholtz resonant cavities 32, and the light steel furring 33, with overall dimensions of 700 mm (W)×1400 mm (D)×20 mm (H). The light steel furring 33 are respectively snap-fitted on both sides of the porous sound-absorbing material 31, the porous sound-absorbing material 31 is made of inorganic non-metallic foam with a porosity of 31280 Pa·s/m$^2$, and is embedded inside the light steel furring 33; and a porous structure is capable of efficiently absorbing sound wave energy and reducing reflection and propagation of sound waves. Each of the Helmholtz resonant cavities 32 is a dual-opening Helmholtz resonator with a truncated pyramid structure, and a number of the Helmholtz resonant cavities is 16; and the Helmholtz resonant cavities are tilted and embedded inside the porous sound-absorbing material 31 to absorb low-frequency sound waves of 100-500 Hz. The light steel furring 33 is U-shaped and has a thickness of 20 mm, which serves as a structural frame for the sound absorption matching layer 3; The light steel furring 33 not only provides structural stability but also enhances sound absorption effect through shape and thickness thereof, and works in synergy with the porous sound-absorbing material 31 and the Helmholtz resonant cavities 32.

Figure 10:
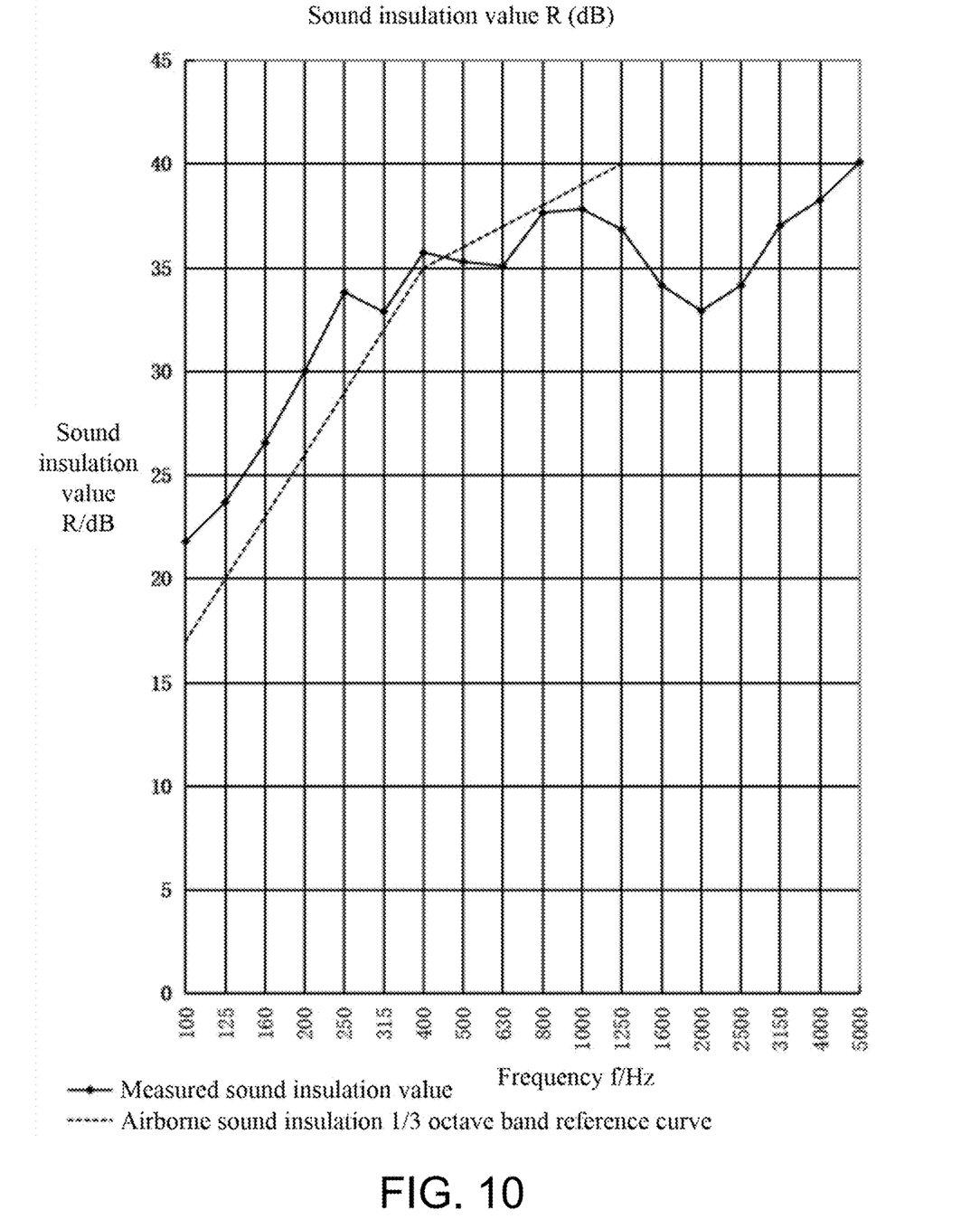
FIG. 10 is a sound insulation characteristics curve according to the present disclosure.

As shown in FIG. 10, the composite damping lightweight sound insulation wall was subjected to experimental tests to obtain a sound insulation characteristics curve of frequency response thereof. With an overall thickness was 50 mm and a surface density of 25 kg/m$^2$ of the structure, the lightweight sound insulation wall exhibited excellent low-frequency sound insulation performance, with a sound insulation value of 36 dB in a ⅓ octave band of 200 Hz-8 kHz. The composite damping lightweight sound insulation wall in the present disclosure complies with the requirements set forth in the Code for Fire Protection Design of Buildings and has a fire resistance rating of Class II. A sound insulation quality law is R=20l g (m)+20l g (f)−42, where m is a mass, and f is a frequency. However, the sound insulation characteristics of the composite damping lightweight sound insulation wall are affected by various factors such as damping, density, thickness of the material, frequency of noise source, and boundary conditions. As a result, theoretical calculation results of sound insulation performance of the well may deviate from the actual performance.

What is claimed is:

1. A composite damping lightweight sound insulation wall, comprising lightweight sound insulation layers, composite damping layers, and a sound absorption matching layer, wherein the composite damping layers are positioned on both sides of the sound absorption matching layer to form a sandwich structure; and the lightweight sound insulation layers are positioned on outer surfaces of the composite damping layers; each of the composite damping layers comprises damping layers, shear columns, and an air layer, the damping layers are respectively arranged on both ends of the shear columns, the shear columns are periodically distributed along the damping layers, and the air layer is located between the adjacent damping layers; and the sound absorption matching layer consists of porous sound-absorbing material, Helmholtz resonant cavities, and light steel furring, the light steel furring are respectively snap-fitted on both sides of the porous sound-absorbing material, and the Helmholtz resonant cavities are tilted and embedded inside the porous sound-absorbing material,
    wherein each of the shear columns is an elastic double C-shaped truncated cone structure, with an upper base radius of 0.5-3 mm, a lower base radius of 1-5 mm, and a height of 3-8 mm; and the shear columns are made of silicone rubber, nitrile rubber, or styrene butadiene rubber.

2. The composite damping lightweight sound insulation wall according to claim 1, wherein a total thickness of the lightweight sound insulation layer, the composite damping layer, and the sound absorption matching layer is 30-60 mm.

3. The composite damping lightweight sound insulation wall according to claim 1, wherein the lightweight sound insulation layer comprises a surface decorative layer, a flexible connection layer, and a galvanized steel plate, the flexible connection layer is arranged between the surface decorative layer and the galvanized steel plate, and the galvanized steel plate is connected to the composite damping layers.

4. The composite damping lightweight sound insulation wall according to claim 3, wherein the surface decorative layer is made of wood board, gypsum board, or fiberboard, with a thickness is of 1-5 mm.

5. The composite damping lightweight sound insulation wall according to claim 3, wherein the flexible connection layer is made of silicone rubber foam, with a thickness of is 1-3 mm; and a thickness of the galvanized steel plate is 1-2 mm.

6. The composite damping lightweight sound insulation wall according to claim 1, wherein each of the damping layers is a silicone-based viscoelastic damping plate, with a thickness of 2-5 mm.

7. The composite damping lightweight sound insulation wall according to claim 1, wherein the air layer is an impedance matching layer, with a thickness of 3-8 mm.

8. The composite damping lightweight sound insulation wall according to claim 1, wherein a number of the shear columns is 4-48.

9. The composite damping lightweight sound insulation wall according to claim 1, wherein the porous sound-absorbing material is made of one or more of fiber materials and foam materials; each of the Helmholtz resonant cavities is a single-opening or double-opening Helmholtz resonator; and the light steel furring is U-shaped, with a thickness of 20-50 mm.

* * * * *